United States Patent
Tanabe et al.

(10) Patent No.: US 7,191,217 B2
(45) Date of Patent: Mar. 13, 2007

(54) DISTRIBUTED SERVER-BASED COLLABORATIVE COMPUTING

(75) Inventors: Naohisa Tanabe, Suginami-ku (JP); Shinya Hanano, Higashiyamato (JP); Masafumi Higuchi, Chigasaki (JP); Kenji Takahashi, Setagaya-ku (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 752 days.

(21) Appl. No.: 10/342,389

(22) Filed: Jan. 15, 2003

(65) Prior Publication Data

US 2003/0195932 A1 Oct. 16, 2003

(30) Foreign Application Priority Data

Apr. 10, 2002 (JP) ............................. 2002-108396

(51) Int. Cl.
*G06F 15/16* (2006.01)

(52) U.S. Cl. ...................................... 709/205; 709/229

(58) Field of Classification Search ........ 709/204–205, 709/203, 229; 715/751; 719/328; 707/1, 707/9; 726/4, 7; 705/51
See application file for complete search history.

(56) References Cited

U.S. PATENT DOCUMENTS

| | | | |
|---|---|---|---|
| 5,694,546 A | 12/1997 | Reisman | |
| 5,861,883 A | 1/1999 | Cuomo et al. | |
| 6,175,876 B1 | 1/2001 | Branson et al. | |
| 6,195,091 B1* | 2/2001 | Harple et al. | ................ 715/751 |
| 6,240,442 B1* | 5/2001 | Domenikos et al. | ......... 709/203 |
| 6,356,933 B2 | 3/2002 | Mitchell et al. | |
| 6,397,264 B1* | 5/2002 | Stasnick et al. | ............. 719/328 |
| 2003/0004882 A1* | 1/2003 | Holler et al. | .................. 705/51 |
| 2003/0009523 A1* | 1/2003 | Lindskog et al. | ............ 709/205 |

FOREIGN PATENT DOCUMENTS

| | | |
|---|---|---|
| JP | 3-273443 | 12/1991 |
| JP | 8-241276 | 9/1996 |
| JP | 8-241280 | 9/1996 |
| JP | 10-334051 | 12/1998 |
| JP | 11-25042 | 1/1999 |
| JP | 2000-112862 | 4/2000 |
| WO | WO 01/53937 | 7/2001 |
| WO | WO 02/21312 | 3/2002 |

* cited by examiner

*Primary Examiner*—Abdullahi Salad
(74) *Attorney, Agent, or Firm*—Oblon, Spivak, McClelland, Maier & Neustadt, P.C.

(57) ABSTRACT

A proxy server is inserted between an SBC server, which is furnished with SBC middleware capable of installation of an application, and a plurality of SBC clients connected to the SBC server via a network in a server-based computing system. The proxy server comprises a manipulation right controller that gives a manipulation right to execute the application to a first SBC client, a manipulation information relay unit that receives first input manipulation information for executing the application from the first SBC client and transmits the first input manipulation information to the SBC server to cause the application to be executed, and an execution screen distributor that receives an execution screen of the application from the SBC server and distributes the execution screen to each of the SBC clients.

23 Claims, 12 Drawing Sheets

DISTRIBUTED SERVER-BASED COLLABORATIVE COMPUTING

BACKGROUND OF THE INVENTION

1. Field of the Invention

The present invention generally relates to a server-based computing (SBC) collaboration technique, and more particularly to a centralized SBC collaboration system using a proxy server that allows multiple remote users to share an application operated on an SBC server and to collaborate with each other on the application.

2. Description of Related Art

In recent years, a so-called SBC (server-based computing) system that allows a user to solely use an arbitrary application operated on the remote SBC server connected to the network through the SBC browser of the SBC client terminal has been developed.

In the SBC system, a high-load application is executed in the server, instead of in the client terminal, and the execution screen is transmitted to the client terminal through the network. The user can use and execute the application on the server as if the application is installed in his/her own terminal. Basically, the relation between the user and the server is one-to-one correspondence, and each user implements the application on the server independently. Since the client terminal simply receives the execution screen in response to the input manipulation, a low-performance terminal, such as a PDA, can be used to execute an intricate high-grade application.

FIG. 1 illustrates a network structure of the conventional SBC system. The conventional SBC system α includes an SBC server 3 furnished with SBC middleware 2 capable of introducing arbitrary applications, and an SBC client 106 accessible to the SBC server 3 through the network 4. The SBC client 106 has an SBC browser 105, through which the user (not shown) of the SBC client 106 can remotely execute the application 1 working on the SBC middleware 2.

When executing the application 1 on the SBC server 3, the user of the SBC client 106 manipulates a mouse, a keyboard, a tablet, joysticks, and other input devices to input information. The SBC browser 105 transmits the user's input manipulation to the SBC middleware 2 operating on the SBC server 3, via the network 4 (ST1).

The SBC middleware 2 supplies the input manipulation information received from the SBC browser 105 to the application 1 that is working on the SBC middleware 2 (ST2). The application 1 executes the process based on the input manipulation information designated by the user, and provides the update screen information, which represents the execution result, to the SBC middleware 2 (ST3). Upon receiving the update screen information, the SBC middleware 2 transmits the update screen information to the SBC client 106 via the network 4, which is then displayed on the SBC browser 105 of the SBC client 106 (ST 4).

By repeating these processes, the user can use and execute the application 1 on the remote SBC server 3 as if he/she is using an application installed in the SBC client 106.

Basically, any application can operate on the SBC server 3 as long as it is operative on the operating system (OS) corresponding to the SBC middleware 2. Such applications include, but are not limited to, editor software, DTP (desktop publishing) software, CAD (computer aided design) software, and game software.

The SBC middleware 2 is, for example, MetaFrame (registered trademark of Citrix Systems, Inc.), VNC (virtual Network Computing; AT&T), Tarantella (registered trademark of SCO), GO-Global (registered trademark of GraphOn Corporation), etc.

The SBC middleware 2 used in the conventional SBC system α is designed on the condition that individual users utilize the application 1 on the SBC server independent from each other. Accordingly, it is difficult for the current SBC middleware 2 to allow multiple SBC clients 106 to mutually execute the application 1 to collaborate in real time with the same execution screen on their SBC browsers 105.

On the other hand, a technique of allowing multiple users to share an application available on a Web site for collaboration is disclosed in JPA 2000-112862 and JPA H11-25042. Furthermore, JPA H3-273443 discloses a technique of distributing the execution screen to multiple clients in response to the key manipulation by a client to allow collaboration, under the limitation of a single application actually operating on the server.

However, these techniques cannot be immediately applied to server-based computing (SBC) collaboration, which is on the basis of parallel execution of intricate and advanced remote applications and centralized data management.

SUMMARY OF THE INVENTION

Therefore, it is an object of the present invention to provide a novel SBC collaboration system that allows multiple SBC clients to share an application operating on the remote SBC server and collaborate with each other, making use of the existing SBC system.

To achieve the object, a proxy server is placed in an arbitrary region on the network that connects the SBC server and multiple SBC clients. The proxy server makes copies of the application screen executed by a single SBC client on the SBC server, and distributes the copies to the SBC clients participating in the collaboration. In addition, the proxy server controls the use of the manipulation right to execute the application, and dynamically switches the manipulation right among the SBC clients in response to a request from the SBC clients. These arrangements allow each of the SBC clients participating in the session of collaboration to take part in the manipulation of the application.

In one aspect of the invention, an SBC collaboration system is provided. The SBC collaboration system includes an SBC server furnished with SBC middleware capable of installation of an application, a plurality of SBC clients connected to the SBC server via a network to remotely use the application, and a proxy server inserted between the SBC server and the SBC clients in an arbitrary region on the network. In this system, the proxy server (a) gives a manipulation right to execute the application to a first SBC client, (b) receives first input manipulation information from the first SBC client and transmits the first input manipulation information to the SBC server to cause the application to be executed, and (c) receives an application execution screen from the SBC server and distributes the application execution screen to each of the SBC clients.

The SBC clients constitute a session group for collaboration using the application on the SBC server. The proxy server controls and manages transfer of the manipulation right among these SBC clients constituting the session group. The manipulation right is given to only a single SBC client; however, coordinating the location of the manipulation right allows the multiple SBC clients to collaborate to work on the common application operating on the SBC server.

The proxy server copies the application execution screen produced as a result of the manipulation of the application by the SBC client with the manipulation right, and distributes the copies of the execution screen to the respective SBC clients.

When receiving a manipulation right transfer request from a second SBC client who does not currently have the manipulation right, the proxy server transmits the manipulation right transfer request to the first SBC client to inquire about the transfer of the manipulation right. Upon receiving an acceptance from the first SBC client, the proxy server transfers the manipulation right from the first SBC client to the second SBC client.

By coordinating the transfer and the current location of the manipulation right at the proxy server, collaboration among multiple SBC clients is realized using the existing SBC middleware.

In the second aspect of the invention, a proxy server that is inserted between an SBC server furnished with SBC middleware capable of installation of an arbitrary application and a plurality of SBC clients connected to the SBC server via a network is provided. The proxy server comprises (a) a manipulation right controller that gives a manipulation right to execute the application to a first SBC client, (b) a manipulation information relay unit that receives first input manipulation information of executing the application from the first SBC client and transmits the first input manipulation information to the SBC server to cause the application to be executed, and (c) an execution screen distributor that receives an execution screen of the application from the SBC server and distributes the execution screen to each of the SBC clients.

The execution screen distributor has a copy unit that copies the execution screen corresponding to the number of the SBC clients. Since the proxy server uniformly distributes the copies of the execution screen to the respective SBC clients participating in the session, the communication rate and the response ability between the SBC server and the SBC clients can be maintained high.

When receiving a manipulation right transfer request from a second SBC client who does not currently have the manipulation right, the manipulation right controller transmits the manipulation right transfer request to the first SBC client to inquire about the transfer of the manipulation right. Upon receiving an acceptance from the first SBC client, the manipulation right controller transfers the manipulation right from the first SBC client to the second SBC client.

Since the transfer of the manipulation right to executing the application is controlled by the manipulation right controller, collaboration making use of the existing SBC system can be realized.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENTS

Figure 1:
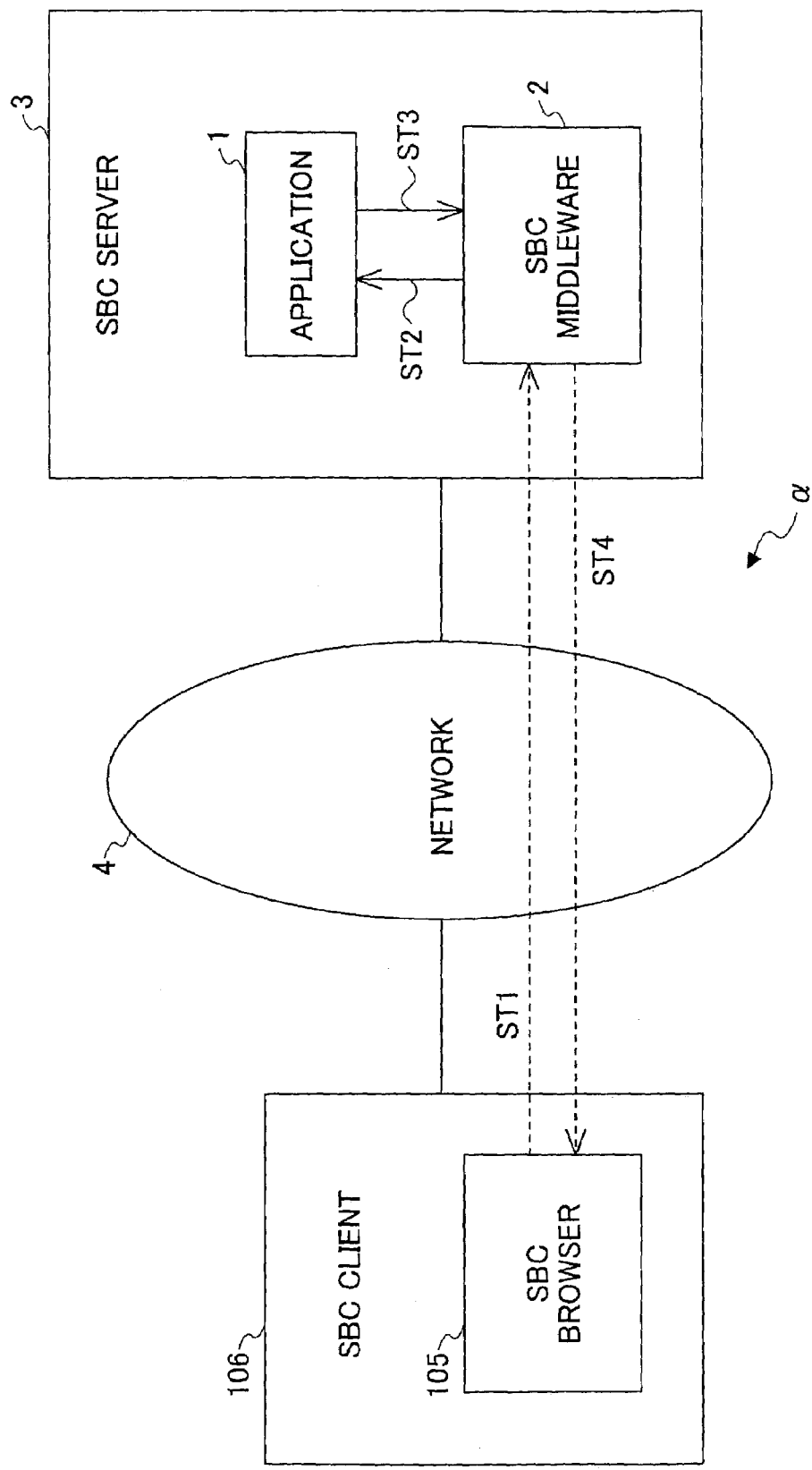
FIG. 1 illustrates a conventional SBC system.
Figure 2:
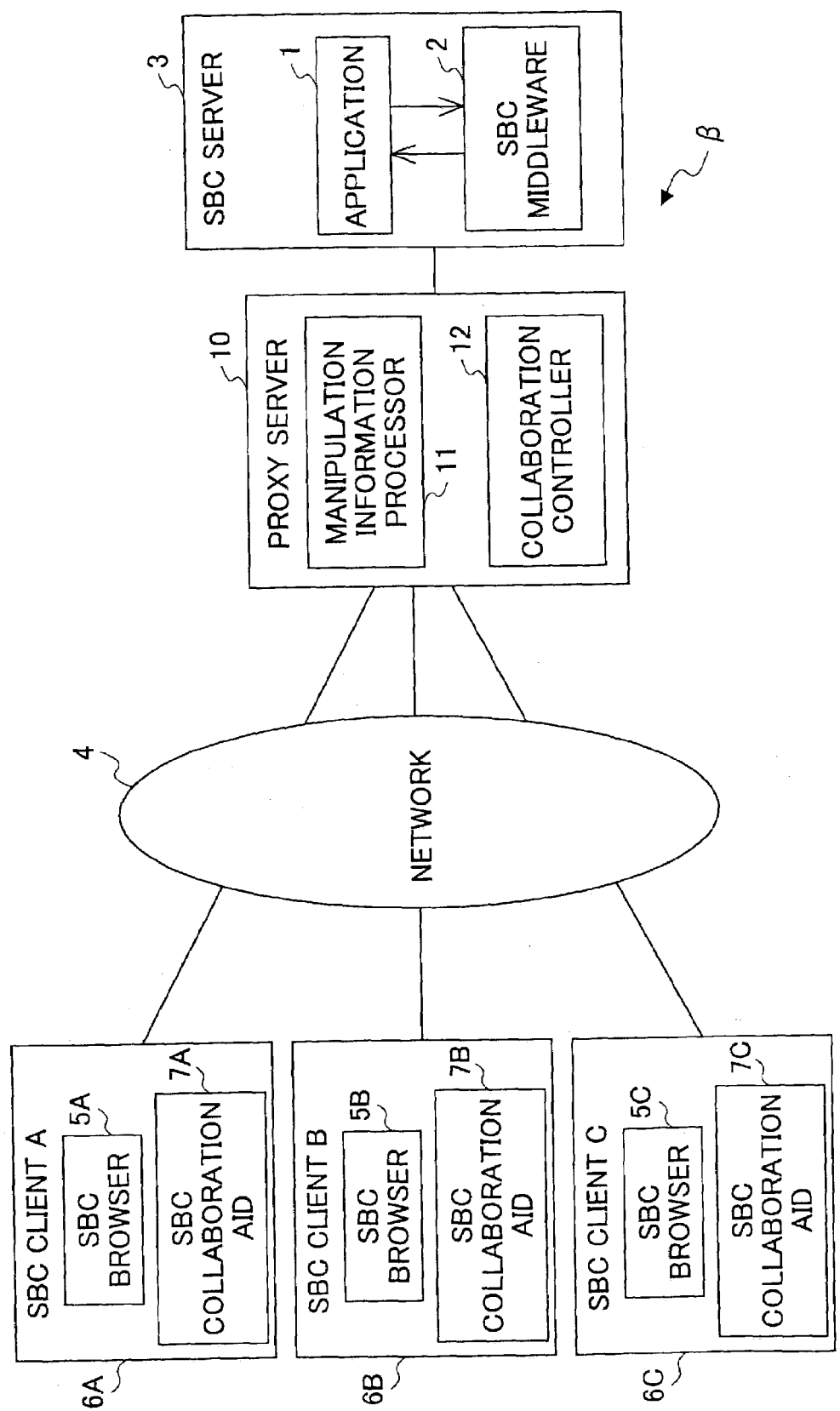
FIG. 2 illustrates the network structure of an SBC collaboration system according to an embodiment of the invention, where a proxy server is inserted between the SBC server and multiple SBC clients in order to allow the SBC clients to share an application on the SBC server and collaborate with each other on the application.

FIG. 2 schematically illustrates the SBC collaboration system β according to an embodiment of the invention. The SBC collaboration system β includes an SBC server 3, SBC clients 6A, 6B, and 6C connected to the SBC server 3 via the network 4, and a proxy server 10 placed in an arbitrary region on the network 4.

The SBC server 3 is furnished with SBC middleware 2, which is capable of introducing arbitrary applications operative on the operating system corresponding to the SBC middleware 2. The SBC middleware can be any known SBC middleware. Each of the SBC clients 6 has an SBC browser 5, and SBC collaboration aid 7. The user of the SBC client can remotely use the application 1 on the SBC middleware 2 through the SBC browser 6 and the network 4. The SBC collaboration aid 7 assists the SBC collaboration process managed by the proxy server from the standpoint of the SBC client 6.

The proxy server 10 is inserted between the SBC server 3 and the SBC clients 6A, 6B and 6C. The proxy server 10 has a manipulation information processor 11 and a collaboration controller 12. The manipulation information processor 11 processes data associated with manipulation of the application that is input through the SBC browser 5 of the SBC client 6. On the other hand, the collaboration controller 12 processes data input through the SBC collaboration aid 7 to control the collaboration operations among the SBC clients 6.

The SBC clients 6A, 6B and 6C, which are connected to the SBC server 3 via the network 4 and the proxy server 10, constitute a session group for conducting a collaboration session using the application 1 operating on the SBC middleware 2. This group is referred to as session group I. In FIG. 2, only three SBC clients 6A, 6B and 6c are illustrated for the sake of convenience; however, of course, four or more SBC clients may be included in the session group I. Although not shown in FIG. 2, many different session groups can be connected to the SBC server 3 via the network 4 and the proxy server 10 to conduct collaboration working in parallel to each other, using the application 1.

The session ID given to the group and the user ID given to each user participating in the session are registered in the proxy server 10 in advance through, for example, contract or reservation of the session. At the reservation or the registration, the IP address and the port number of the proxy server 10 managing and controlling the collaboration are given to the SBC client 6.

The proxy server 10 is a virtual SBC server if being seen from the SBC client 6, and is a virtual SBC client if being seen from the SBC server 3. For the SBC server 3, the client that uses the application 1 is the session group I, and it does not mater at all how many SBC clients belong to the session group I or which SBC client is currently executing the application 1. Although multiple SBC clients actually execute the application 1 by turns in the session group I, the location of the manipulation right is controlled by the proxy server 10, and therefore, the situation in which the entirety of the session group I uses the application 1 as a single client stands, from the viewpoint of the SBC server 3. Accordingly, collaboration on the application 1 by multiple SBC clients is realized using the exiting SBC middleware 2 that has a basic specification of one-to-one correspondence between the client and the manipulation of the application.

Figure 3:
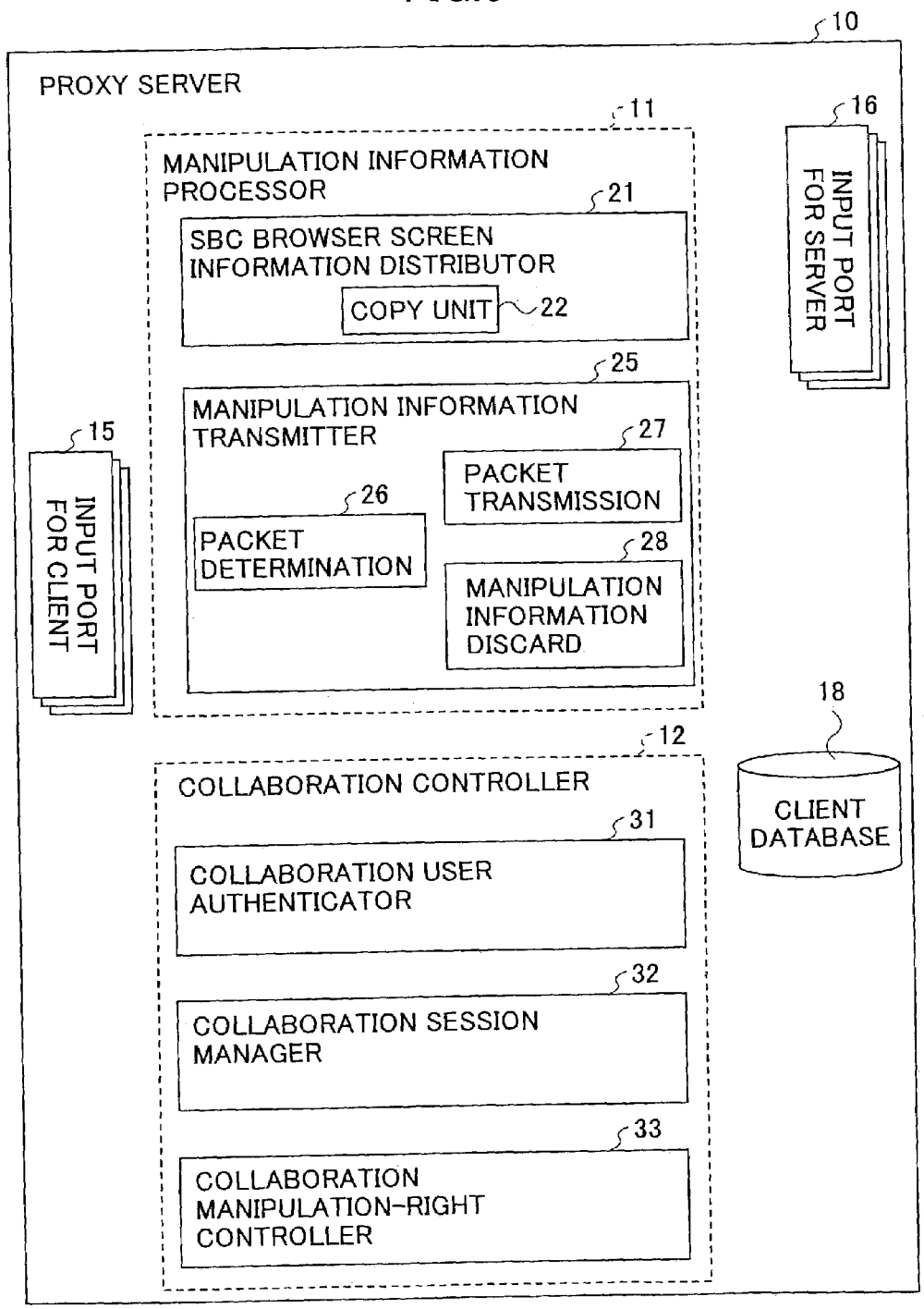
FIG. 3 is a block diagram of the proxy server used in the SBC collaboration system shown in FIG. 2.

FIG. 3 illustrates a block diagram of the proxy server 10. The proxy server 10 has a client input port 15 for receiving inputs from the SBC clients 6A, 6B, and 6C, a server input port 16 for receiving an input from the SBC server 3, and a client database 18 storing information about the clients 6A–6C, in addition to the manipulation information processor 11 and the collaboration controller 12. The client information stored in the client database 18 includes, but not limited to, the session ID, user IDs registered for participation in the session, passwords, the IP number and the port number of the SBC server. A portion or the entirety of the client information is also stored in the SBC server 3.

The client input port 15 sorts the packets transmitted from the SBC clients 6 so as to supply them to either the manipulation information processor 11 or the collaboration controller 12, depending on the contents of the packets.

The manipulation information processor 11 includes a manipulation information transmitter 25 and an SBC browser screen distributor 21. The manipulation information transmitter 25 functions as a relay unit, and when receiving input manipulation from one of the SBC clients 6, the manipulation information transmitter 25 transmits this input manipulation to the SBC server 3. The SBC browser screen distributor 21 distributes the execution screen of the application, which is produced through the execution of the application based on the input manipulation in the SBC server 3, to each of the SBC clients 6A, 6B and 6C. The SBC browser screen distributor 21 has a copy unit 22, which makes copies of the execution screen of the application according to the number of SBC clients participating the session, prior to the distribution of the execution screen.

The manipulation information transmitter 25 includes a packet determination unit 26, a packet transmission unit 27, and a manipulation information discard unit 28. The packet determination unit 26 determines whether or not the packet supplied from the client input port 15 is a packet transmitted from the SBC client that currently has the manipulation right to execute the application 1 (hereinafter, referred to as the "privileged user"). If the packet is transmitted from the privileged user, this packet is transmitted by the packet transmission unit 27 to the SBC server 3. If the packet is transmitted from a user other than the privileged user (hereinafter, referred to as an "ordinary user"), then, the manipulation information discard unit 28 discards this packet, regarding the packet as being transmitted due to error manipulation.

The collaboration controller 12 includes a collaboration user authenticator 31, a collaboration session manager 32, and a collaboration manipulation-right controller 33. The operations of these elements will be described below.

Figure 4:
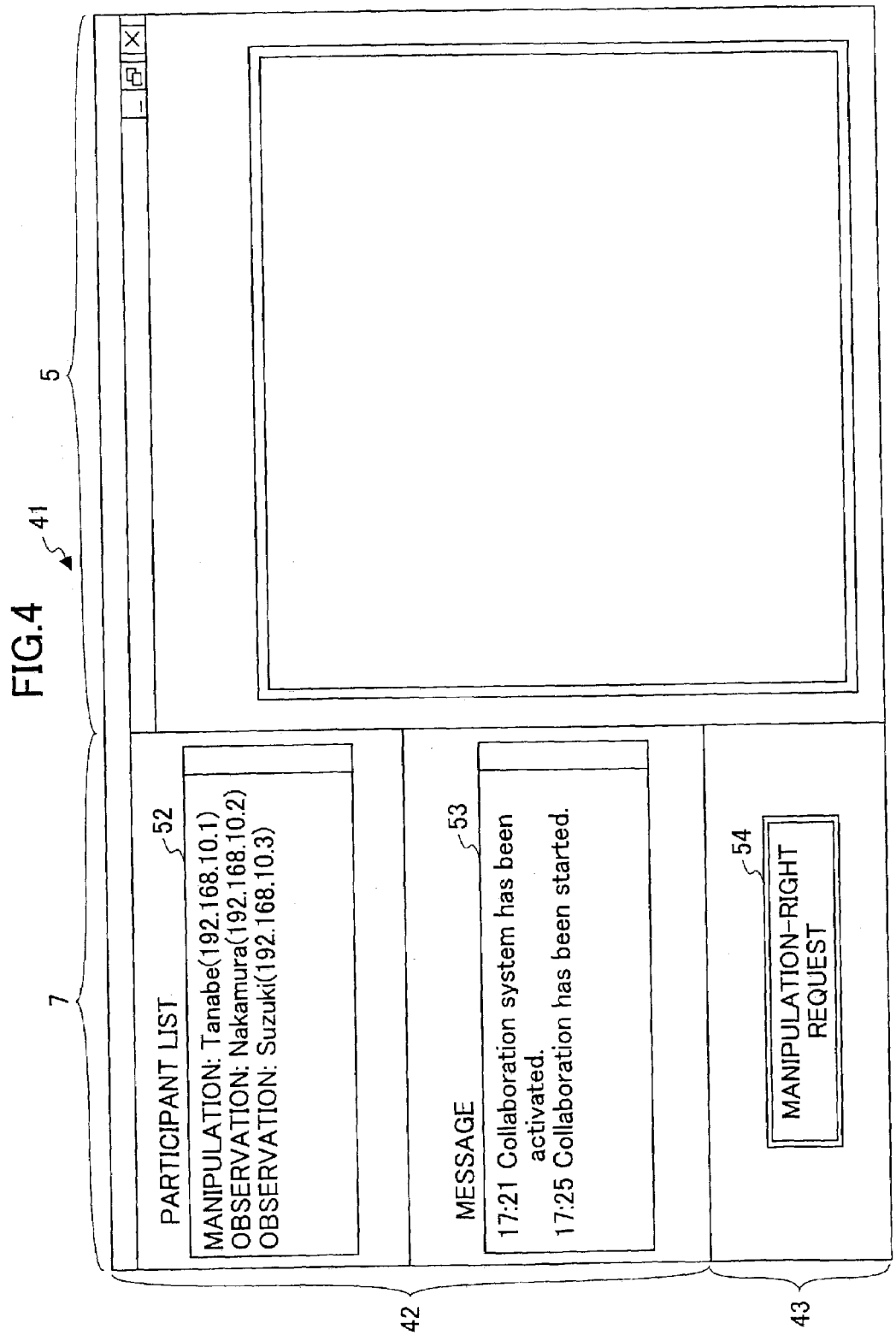
FIG. 4 illustrates an example of the SBC collaboration browser opened on the SBC client.

FIG. 4 illustrates an example of the SBC collaboration browser 41 opened on the SBC client 6. The SBC collaboration browser 41 is comprised of an SBC browser 5 and an SBC collaboration aid 7. The SBC browser 5 displays the execution screen (i.e., the SBC browser screen), which has been produced by the SBC server 3 as the result of the execution of the application 1, and copied and distributed by the proxy server 10. All the users participating in the collaboration session can browse the update execution screen in real time on the SBC browser 5.

The SBC collaboration aid 7 includes a session information panel 42 and an active control panel 43. The session information panel 42 has, for example, a participant list 52 and a message window 53. The participant list 52 lists the users who are participating in the session, indicating the current privileged user to which the manipulation right belongs. The message window 53 displays, for example, the session record. The active control panel 43 has a manipulation-right request button 54. If any one of the ordinary users of the SBC clients 6 wishes to execute the application 1 during the collaboration session on the SBC middleware 2, the ordinary user clicks the manipulation-right request button 54. The transfer of the manipulation right triggered by the click of the manipulation-right request button 54 will be explained in detail below.

In the example shown in FIG. 4, the manipulation right is currently given to Mr. Tanabe who is the user of SBC client 6A. The other users of the SBC clients 6B and 6C only have the browsing right. Since the browsing right is automatically given to all the users participating in the session, the privileged user has the browsing right and the manipulation right. Accordingly, bi-directional communication occurs between the privileged user of the SBC client 6A and the proxy server 10, while a unidirectional communication occurs between the proxy server 10 and each of the ordinary users of SBC clients 6B and 6C.

At the beginning of the collaboration session, the manipulation right may be given by the proxy server 10 to the user that first accesses the proxy server 10 to call the session, or alternatively, the initial privileged user may be determined in advance.

Figure 5:
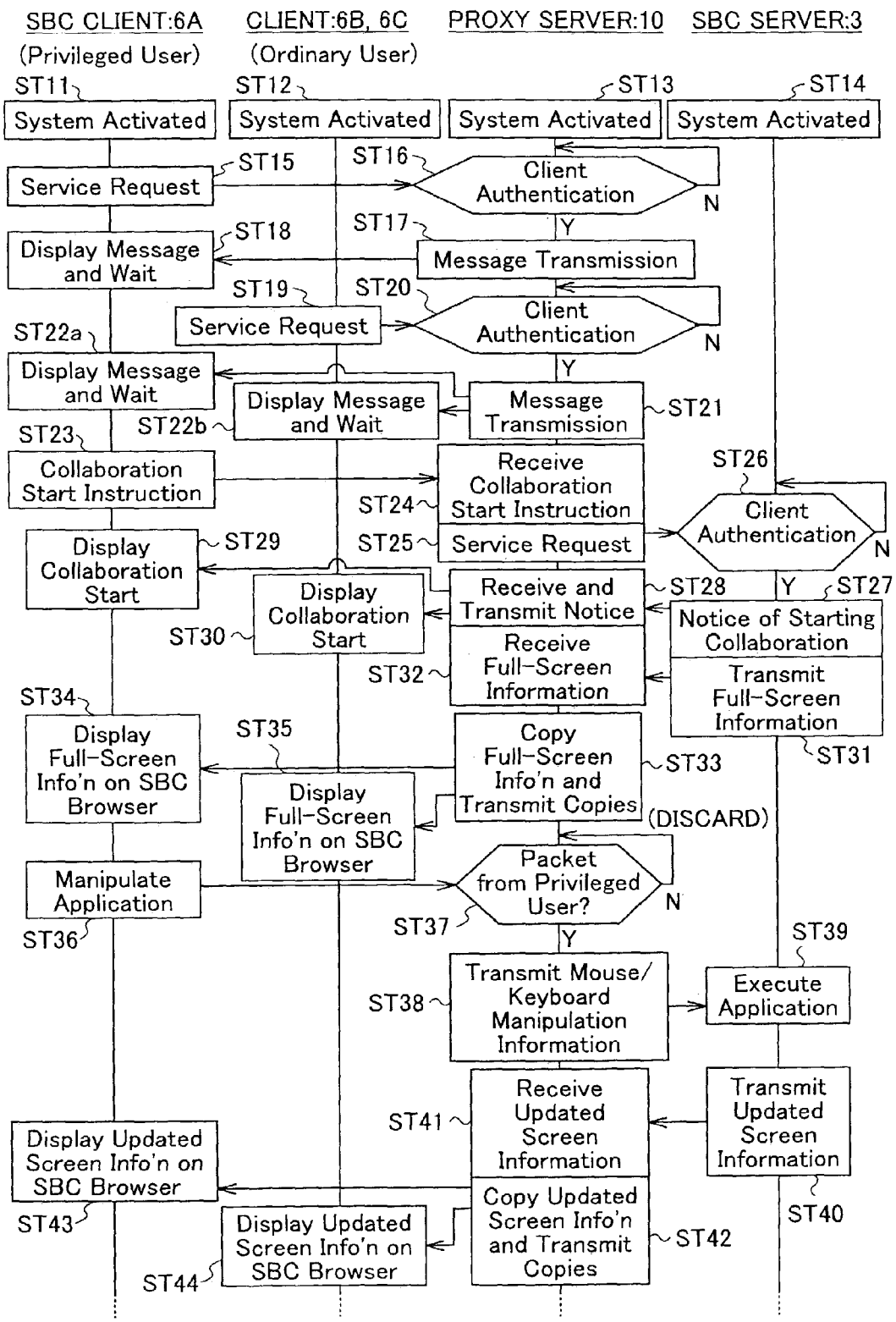
FIG. 5 is a sequence diagram for starting and carrying out the SBC collaboration.

FIG. 5 illustrates a sequence of the collaboration process using the SBC collaboration system β shown in FIG. 2. The SBC clients 6A through 6C, the proxy server 10, and the SBC server 3 are all in the active state for the collaboration (ST11–ST14).

Then, for example, the user of SBC client 6A requests a connection service to the designated port (not shown) of the proxy server 10 (ST15). The connection request is made through the SBC collaboration aid 7 on the SBC collaboration browser 41. The proxy server 10 carries out client authentication for the connection request from the SBC client 6A (ST16).

In the client authentication, the collaboration user authenticator 31 of the proxy server 10 receives the user ID, the password, and the IP address of the SBC client 6A from the client input port 15. The collaboration user authenticator 31 requests the collaboration session manager 32 to confirm the session ID. The collaboration session manager 32 accesses the client database 18 to extract the reserved session ID for this session group, based on the port number of the proxy server 10 accessed by the SBC client 6A. The collaboration session manager 32 then retrieves the user IDs of the registered participants based on the extracted session ID. If the user ID of the SBC client 6A is included in the retrieved user IDs, the collaboration user authenticator 31 checks the password and finishes the authentication (YES in ST16). The collaboration user authenticator 31 transmits an authentication admission notice to the SBC client 6A (ST17).

During this process, upon the success of the authentication of SBC client 6A, the collaboration session manager 32 updates the session information, such as the session ID, the user ID, and the client IP address. Along with the updating of the session information, the collaboration manipulation-right controller 33 gives the manipulation right to the SBC client 6A, which has first accessed the proxy server 10 for the collaboration session, and updates the manipulation-right information.

At this point of time, the user name "Tanabe" is displayed as the privileged user, together with the IP address "192.168.10.1", in the participant list 52 (see FIG. 4) of the SBC collaboration aid 7A of the SBC client 6A. Then, the SBC client 6A waits until authentication of the other session participants are completed (ST18).

Similarly, the other SBC clients 6B and 6C make connection to the proxy server 10 (ST19), and are, subjected to the client authentication (YES in ST20). Every time the client authentication has been completed for each of the SBC clients 6B and 6C, the proxy server 10 transmits the authentication admission notice to all the SBC clients that are already in the session (ST21). Then the names of the authenticated users are displayed one by one on the participant list 52 of the SBC collaboration aid 7.

For example, if the connection request made by the SBC client 6B is authenticated, the user name (e.g., Nakamura) of the SBC client 6B is added to the participant list 52 of the SBC client 6A (ST22*a*). At the same time, the name "Tanabe" of SBC client 6A (i.e., the privileged user) and the name "Nakamura" of SBC client 6B (i.e., the new participant) are displayed on the participant list 52 of the SBC client 6B (ST22*b*). Then, SBC client 6A and SBC client 6B wait until authentication for all the participants is completed (ST22*a* and ST22*b*).

Then, the SBC client 6A (i.e., the privileged user) transmits a collaboration start instruction to the proxy server 10 (ST23). The proxy server 10 receives the collaboration start instruction (ST24), and requests the SBC server 3 to start the SBC collaboration service (ST25).

The SBC server 3 performs the authentication process for the service request (that is, the session start instruction) transmitted from the proxy server 10 (ST26). Upon success of the authentication (YES in ST26), the SBC server 3 transmits a notice of starting collaboration to the proxy server 10 (ST27). Upon receiving the notice, the proxy server 10 transmits this notice to all the SBC clients 6A, 6B, and 6C of the participating users (ST28). With this notice, the start of collaboration is recorded in the message window 53 of each of the SBC clients 6A through 6C, as illustrated in FIG. 4 (ST29 and ST30).

In parallel to starting the collaboration, the SBC server 3 transmits full-screen (or the initial page) information to the proxy server 10 (ST31). Upon receiving the full-screen information (ST32), the proxy server 3 copies the full-screen information according to the number of the participating users, and distributes the copies of the full-screen information to the SBC clients 6A, 6B and 6C (ST33). Then the distributed full-screen information is displayed on the SBC browsers 5A, 5B, and 5C of the SBC clients 6A, 6B, and 6C, respectively (ST34 and ST35).

Figure 6:
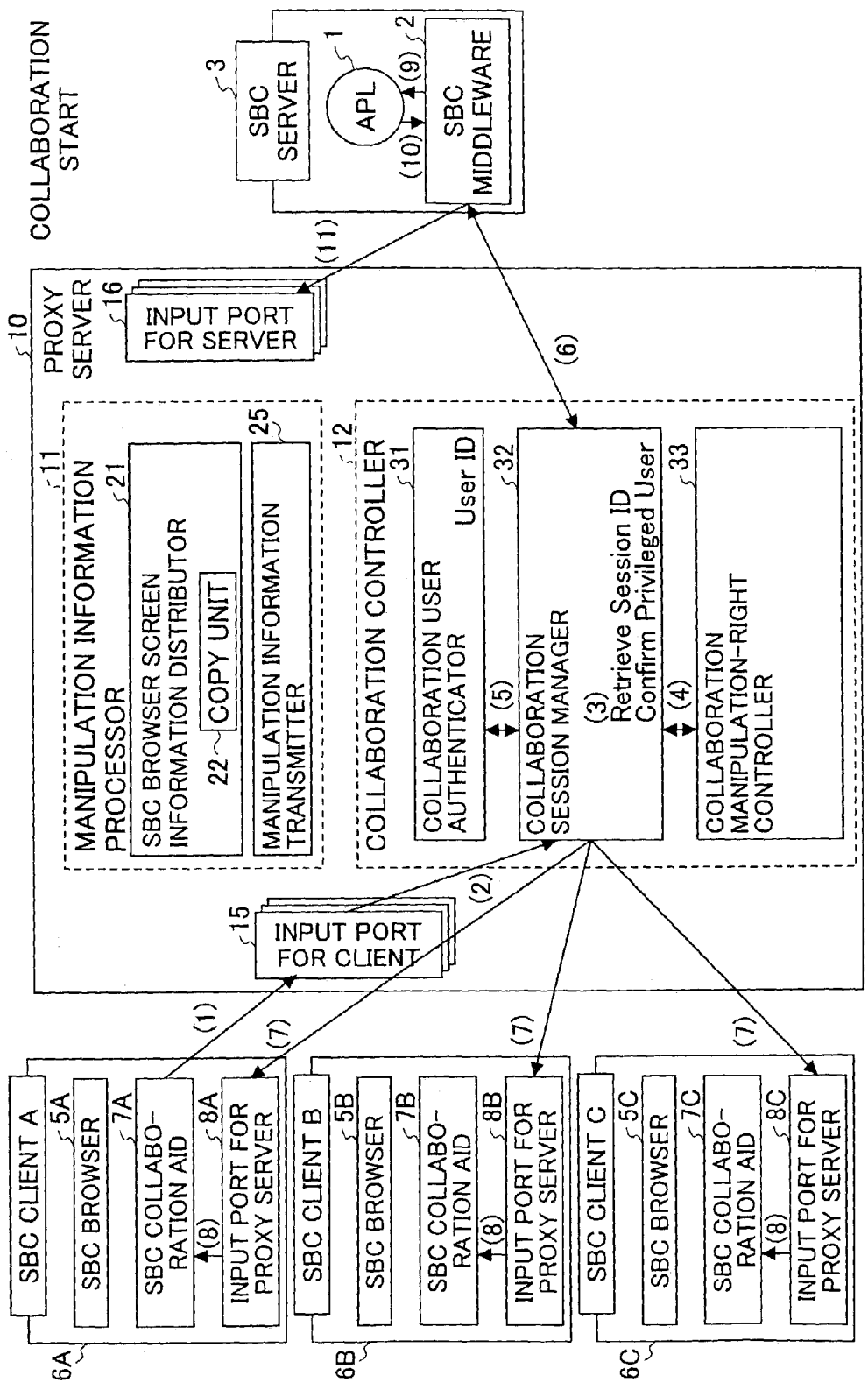
FIG. 6 is a diagram used to explain the behavior of the system when starting the SBC collaboration.
Figure 7:
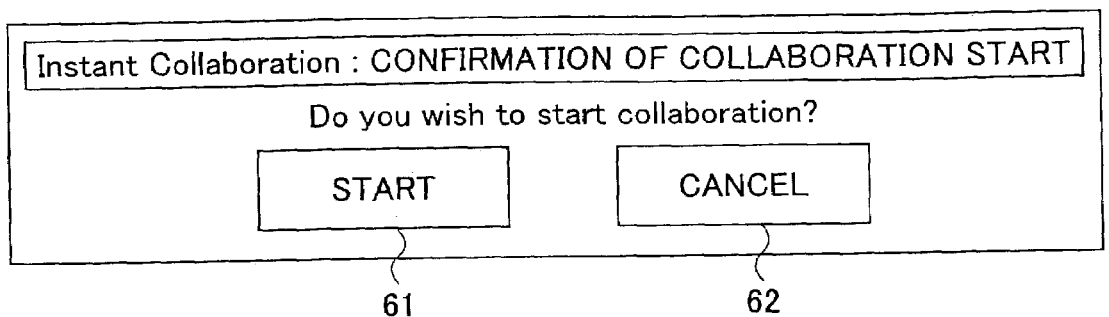
FIG. 7 illustrates an example of the confirmation window for collaboration start.
Figure 8:
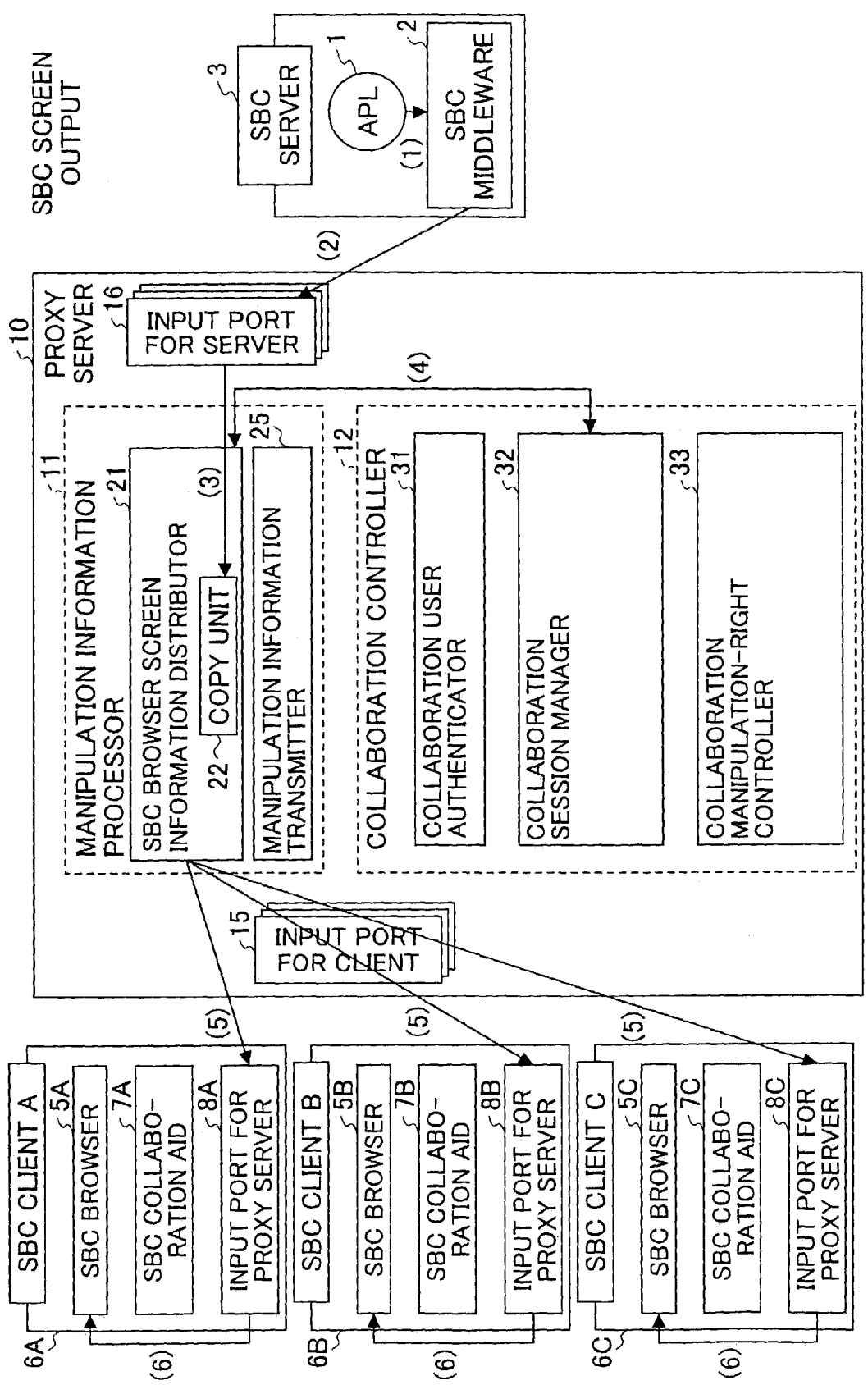
FIG. 8 is a diagram used to explain the behavior of the system when outputting an SBC screen during the SBC collaboration.

FIG. 6 and FIG. 8 illustrate the above-described collaboration start process (ST23 through ST30) and the full-screen output process (ST31 through ST35), respectively, from the standpoint of the system behavior. In FIG. 6, the SBC collaboration aid 7A of the SBC client 6A of the privileged user transmits a collaboration start instruction to the proxy server 10 (as indicated by the arrow (1)). The collaboration start instruction is made by, for example, clicking the start button 61 in the collaboration start confirmation window, as illustrated in FIG. 7.

The system may be designed so that the collaboration start confirmation window is opened only in the SBC collaboration aid 7A of the privileged user (i.e., SBC client 6A) that has first accessed the proxy server for the session. In this case, the manipulation right to execute the application 1 implies the right to start the collaboration. Alternatively, the collaboration start confirmation window may be opened in the SBC collaboration aids 7A, 7B, and 7C of all the authenticated SBC clients 6A, 6B, and 6C. In the latter case, even if the ordinary user who does not have the manipulation right clicks the collaboration start button 61, this start instruction is denied through the authentication and confirmation processes carried out by the collaboration user authenticator 31 and the collaboration manipulation-right controller 33. Consequently, the collaboration is after all started by the privileged user.

The collaboration start instruction is received at the client input port 15 of the proxy server 10, and supplied to the collaboration session manager 32 (as indicated by the arrow (2)). The collaboration session manager 32 retrieves the session ID based on the port number of the proxy server 10, at which the collaboration start instruction is received, and confirms that the session identified by the retrieved session ID is non-activated, being ready for collaboration. The collaboration session manager 32 also confirms the user ID of the privileged user who has transmitted the collaboration start instruction (process (3)).

The collaboration session manager 32 inquires of the collaboration manipulation-right controller 33 whether the manipulation right of this session currently belongs to the user who has requested to start the collaboration (as indicated by the bi-directional arrow (4)). Upon receiving a positive result, the collaboration session manager 32 acquires the password of the user who has requested the collaboration start (as indicated by the bi-directional arrow (5)).

After the password is acquired, the collaboration session manager 32 requests the SBC server 3 to start the SBC collaboration session. The SBC server 3 executes client authentication from the user ID, the password, the port number of the SBC server 3, etc., and transmits a response to the session start request to the proxy server 10 (as indicated by the bi-directional arrow (6)). For the sake of convenience, process (6) is indicated by the bi-directional arrow; however, the response from the SBC server 3 is actually supplied to the collaboration session manager 32 via the server input port 16.

The collaboration session manger 32 then transmits a session start notice to the proxy input ports 8A, 8B, and 8C of the SBC clients 6A, 6B, and 6C (as indicated by the arrows (7)). The session start notice is supplied to the SBC collaboration aids 7A, 7B and 7C of the respective SBC clients (as indicated by the arrows (8)), and displayed in the message window 53 (see FIG. 4). In the example of FIG. 4, the message "17:25 Collaboration has been started" is announced.

On the other hand, the SBC middleware 2 starts the application 1 in response to the session start request (as indicated by the arrow (9)). The application 1 outputs the full-screen (or the initial page) of this application (as indicated by the arrow (10)). The SBC server 3 transmits the full-screen information to the server input port 16 of the proxy server 10 (as indicated by the arrow (11)). In this manner, the session is started.

FIG. 8 illustrates the system behavior when the SBC browser screen is output. The operational process shown in FIG. 8 is equally applied to both the output of the full-screen information immediately after the session start and the output of the execution screen resulting from the execution of the application 1. The only difference is that when outputting the full-screen information, the entirety of the screen information is copied and distributed to the SBC clients 6, while for the application execution screen only the updated portion due to the manipulation of the application 1 is copied and distributed. Accordingly, explanation will be made using an example of outputting the full-screen information.

First, the application 1 started by the SBC server 3 in response to the session start request opens the initial page as the full-screen on the SBC middleware 2 (as indicated by the arrow (1)). The SBC middleware 2 transmits the full-screen information of the initial page, together with its attribute, to the proxy server 10 (as indicated by the arrow (2)). The server input port 16 of the proxy server 10 supplies the full-screen information and the attribute, as well as the port number, to the copy unit 22 of the SBC browser screen information distributor 21 (as indicated by the arrow (3)).

The SBC browser screen information distributor 21 inquires of the collaboration session manager 32 about the destinations of the full-screen information. The collaboration session manager 32 retrieves the session ID and the IP addresses of all the SBC clients 6 participating in the session from the port number, and supplies the retrieved destinations to the SBC browser screen information distributor 21 (as indicated by the bi-directional arrow (4)). The SBC browser screen information distributor 21 copies the full-screen information as many as the number of the destinations at the copy unit 22, and delivers the copies to the SBC clients 6A, 6B and 6C (as indicated by the arrows (5)).

The proxy input ports 8A, 8B and 8C of the SBC clients 6A, 6B and 6C receive the full-screen information and supply this to the SBC browsers 5A, 5B and 5C, respectively (as indicated by the arrows (6)). The SBC browsers 5A, 5B and 5C display the full-screen initial page.

Returning to FIG. 5, when the full-screen information of the initial page is displayed on the SBC browsers 5A, 5B and 5C of all the participants, the collaboration is substantially available. The privileged user of SBC client 6A, who currently has the manipulation right to execute the application 1, manipulates the mouse, the keyboard, or other devices to execute the application 1 through the SBC browser 5A (ST36). The input manipulation information of the mouse, the keyboard, and other devices is received at the client input port 15 of the proxy server 10, and supplied to the manipulation information transmitter 25 of the manipulation information processor 11.

The packet determination unit 26 of the manipulation information transmitter 25 determines whether or not the packet containing the input manipulation information has been transmitted from the privileged user having the manipulation right (ST37). If the packet is transmitted from the ordinary user who does not have the manipulation right (NO in ST37), the manipulation information discard unit 28 discards the input manipulation information. If the packet is transmitted from the privileged user (YES in ST37), the packet transmission unit 27 transmits this packet to the SBC server 3 (ST38).

Packet determination unit 26 determines the source of the packet by inquiring of the collaboration session manager 32 and the collaboration manipulation-right controller 33 about the session ID, the participating user IDs, and the current privileged user ID with respect to the received packet. Through the determination process, the manipulation information transmitter 25 relays the packet to the SBC server 3 only when the packet has been transmitted from the privileged user who has the manipulation right. Those packets from the ordinary users are discarded in order to prevent the manipulation of the application 1 from becoming inconsistent due to error manipulation or an unconscious touch on the mouse or the keyboard.

Upon receiving the input manipulation information produced by the privileged user, the SBC server 3 executes the application 1 based on the input manipulation information (ST39). As the result of the execution of the application 1, the execution screen is updated. The SBC server 3 transmits the updated screen information of the updated (or changed) portion to the proxy server 10 (ST40). As has been explained above, once the execution of the application 1 is started, it is not necessary to transmit full-screen information, instead, only the differential information resulting from the execution is transmitted.

The updated screen information is received at server input port 16 of the proxy server 10, and supplied to the SBC browser screen information distributor 21. Upon receiving the updated screen information (ST41), the SBC browser screen information distributor 21 makes copies of the updated screen information at the copy unit 22 as many as the number of the participating users, and delivers the copies to the SBC clients 6A, 6B and 6C (ST42). The SBC clients 6A, 6B and 6C incorporate the updated screen information into the full-screen information and display the execution result of the application on the SBC browsers 5A, 5B and 5C (ST43 and ST44).

Since the copy and the delivery of the updated screen information are the same as those of the full-screen information explained with reference to FIG. 8, explanation for them will be omitted. As long as the privileged user continues executing the application 1, steps ST36 through ST44 are repeated, and the execution screen is displayed on the SBC clients 6A, 6B and 6C in real time.

It is sufficient for the SBC clients to merely have a display function to browse the execution of the intricate and advanced application in real time. Consequently, the cost for installation and management of applications in the respective SBC clients can be reduced. After the transmission of the full-screen information at the beginning of the session, only the updated screen information resulting from the execution of the application is transmitted. Accordingly, the data traffic is light, and the satisfactory communication rate can be maintained. Since the screen information is copied for the delivery to the respective SBC clients, the procedure in the proxy server 10 is prompt. As a whole, the SBC collaboration system according to the present invention has high operability and response ability with respect to the execution of the application.

The SBC client of the privileged user having the manipulation right requires only a display and an input device to execute the intricate and advanced application installed in the remote SBC server. The privileged user can manipulate the application as if the application is installed in the SBC client itself. The execution record is concentrated in and managed by the SBC server 3, and the burden on the SBC client for resources management is greatly reduced.

Figure 9:
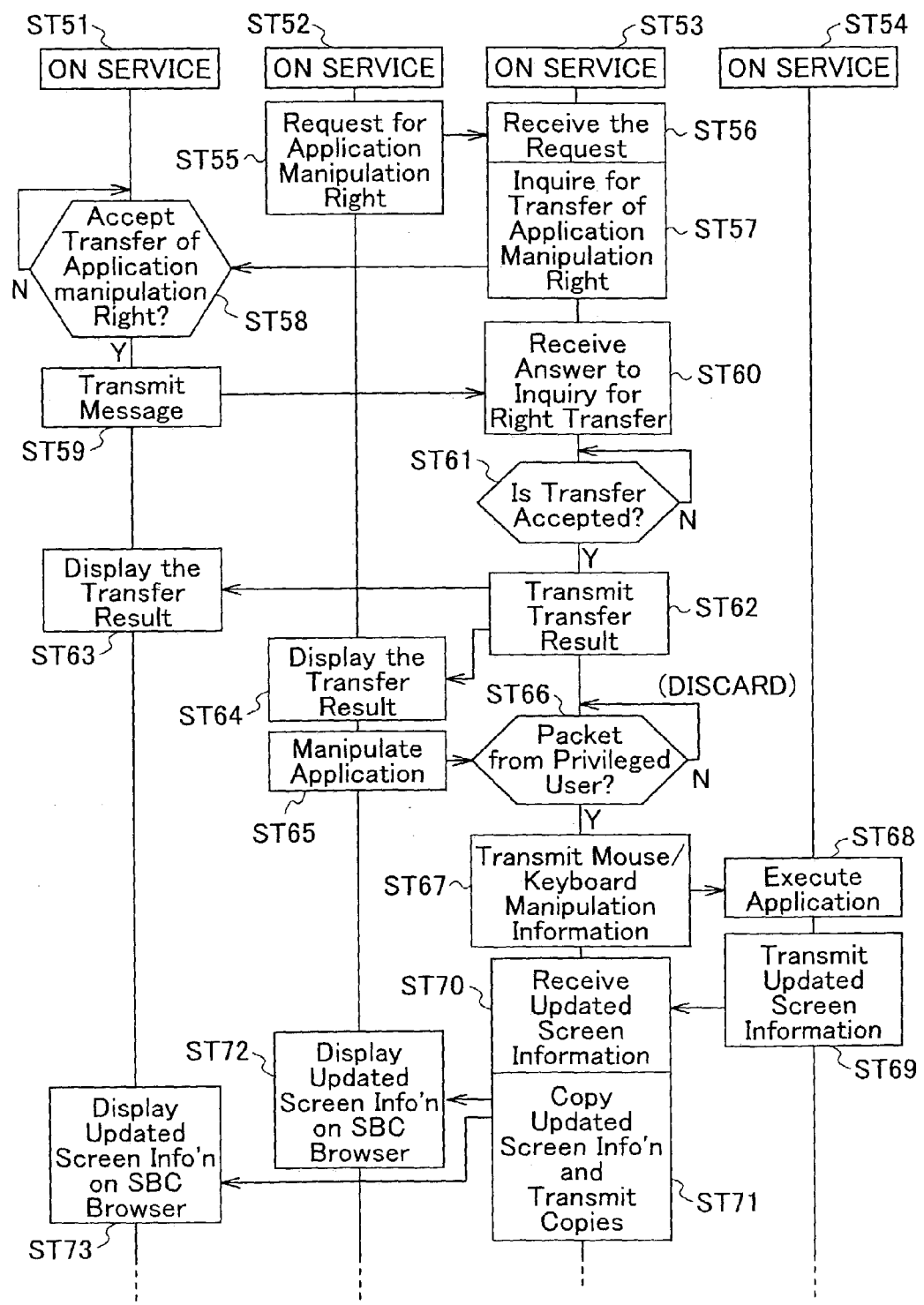
FIG. 9 is a sequence diagram for transferring the manipulation right among the SBC clients.

FIG. 9 illustrates a sequence of the transfer process of the manipulation right among multiple users participating in the session. The SBC clients 6A through 6C, the proxy server 10, and the SBC server 3 are all involved in the session (ST51 through ST54).

Any of the ordinary users of the SBC clients 6B and 6C makes a request for transferring the manipulation right to execute the application 1 by clicking the manipulation-right request button 54 furnished in the SBC collaboration aid 7 shown in FIG. 4 (ST55). The manipulation right transfer request is transmitted to the proxy server 10. Upon receiving the manipulation right transfer request (ST56), the proxy server 10 inquires of the SBC client 6A of the currently privileged user about the transfer of the manipulation right (ST57).

Figure 11A:
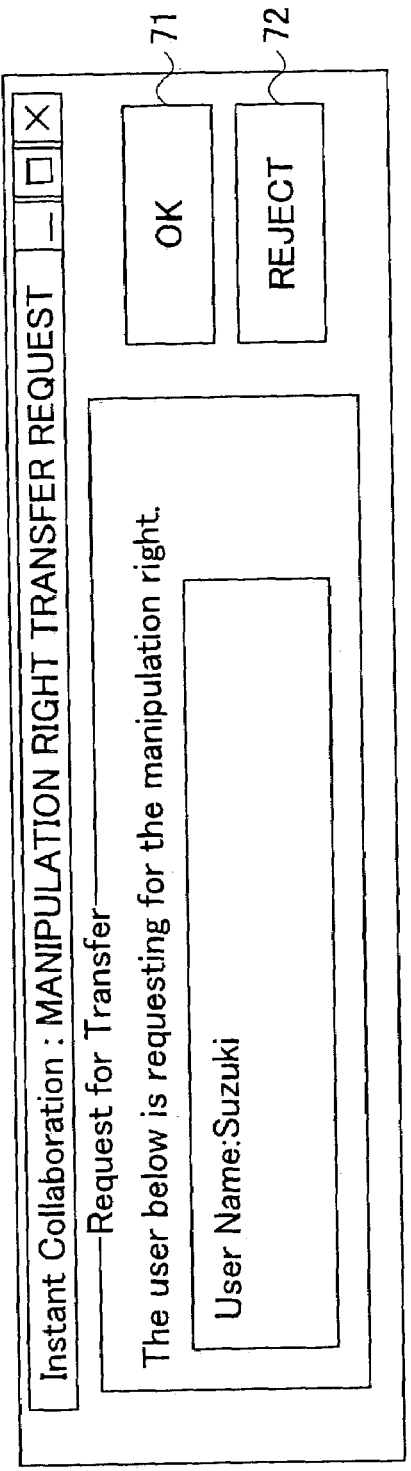
FIG. 11A illustrates an example of the window for a manipulation right transfer request.
Figure 11B:
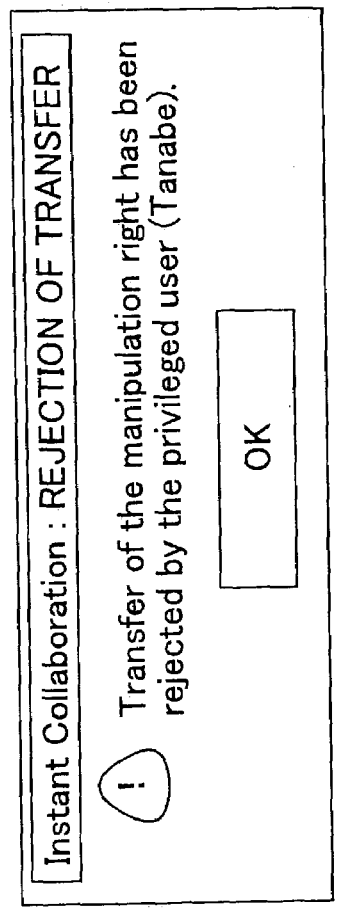
FIG. 11B illustrates an example of the rejection window.

The SBC client 6A inquires of the privileged user whether the manipulation right-transfer request is acceptable (ST58). For example, the manipulation right transfer request window illustrated in FIG. 11A is opened in the SBC collaboration aid 7A of the SBC client 6A. In this example, "Suzuki", the user of the SBC client 6C is requesting for the transfer of the manipulation right. If the manipulation right transfer request is acceptable (YES in ST58), the privileged user clicks the "OK" button 71. If the privileged user does not wish to transfer the manipulation right (NO in ST58), the "REJECT" button 72 is clicked.

In the example shown in FIG. 9, the manipulation right transfer request window is opened only in the SBC collaboration aid 7A of the privileged user (i.e., the SBC client 6A). However, the manipulation right transfer request window may be opened in the SBC collaboration aids 7A through 7C of all the SBC clients 6A through 6C as an advance announcement of the transfer of the manipulation right. In this case, clicks of the "OK" button 71 or the "REJECT" button 72 by the users other than the privileged user are discarded by the proxy server 10 after the confirmation of the user ID of the privileged user.

Through the selection of either button in the manipulation right transfer request window, the response to the inquiry about the transfer of the manipulation right is transmitted from the SBC client 6A to the proxy server 10 (ST59). Upon receiving the response from the privileged user (ST60), the proxy server 10 determines whether or not the transfer of the manipulation right has been accepted (ST61), and transmits the determination result to the SBC clients 6A through 6C (ST62).

The transfer result is displayed on the SBC collaboration aid 7 of all or a part of the SBC clients 6A through 6C (ST63 and ST64), depending on the result. If the manipulation right transfer request made by the SBC client 6C has been rejected, the transfer rejection window is opened in the SBC collaboration aid 7C of the SBC client 6C. If, on the other hand, the manipulation right transfer request has been accepted, the participant lists 52 (see FIG. 4) of all the SBC clients 6A through 6C are changed to, for example, "OBSERVATION: Tanabe (192.168.10.1), OBSERVATION: Nakamura (192.168.10.2), MANIPULATION: Suzuki (192.168.10.3). The order of the participant list 52 does not matter as long as the fact of the transfer of the manipulation right is clearly indicated. The location of the manipulation right may be highlighted or emphasized by a different color. Besides the announcement on the participant list 52, the transfer of the manipulation right may be displayed, together with the time, as a part of the session record in the message window.

Figure 10:
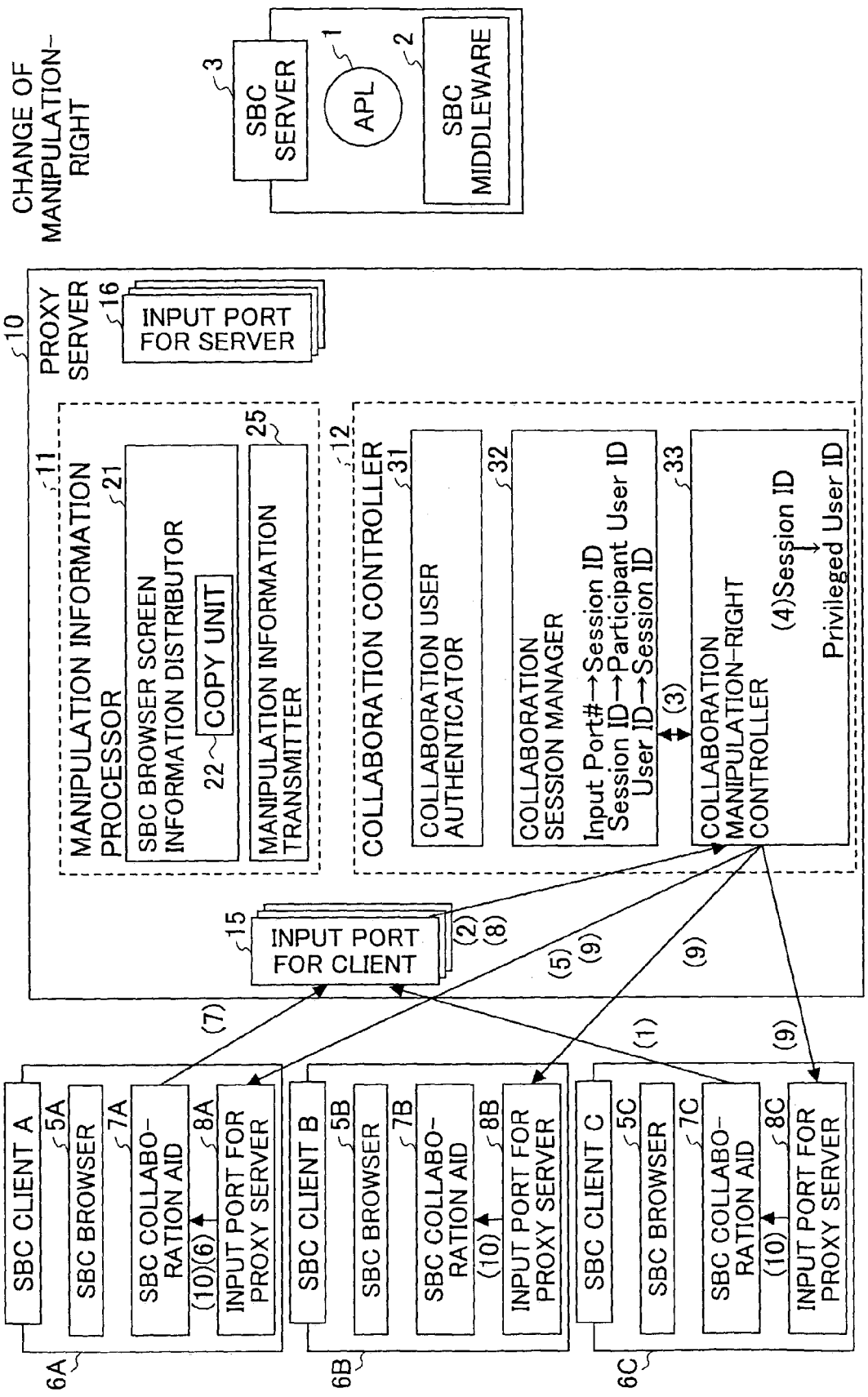
FIG. 10 is a diagram used to explain the behavior of the system when transferring the manipulation right.

FIG. 10 illustrates the system behavior at the time of transfer of the manipulation right. SBC client 6C transmits a manipulation right transfer request from the SBC collaboration aid 7C to the proxy server 10 (as indicated by the arrow (1)). The client input port 15 of the proxy server 10 supplies the manipulation right transfer request to the collaboration manipulation-right controller 33, together with the port number and the client's IP address (as indicated by the arrow (2)). The collaboration manipulation-right controller 33 inquires of the collaboration session manager 32 about the session ID and the user ID. The collaboration session manager 32 extracts the session ID and the user ID based on the port number, and returns the extracted IDs to the collaboration manipulation-right controller 33 (as indicated by the bi-directional arrow (3)). The collaboration manipulation-right controller 33 retrieves the current privileged user ID from the session ID (the process (4)), and transmits the manipulation right transfer request to the current privileged user, that is, the user of the SBC client 6A in this example (as indicated by the arrow (5)).

The proxy input port 8A of the SBC client 6A supplies the manipulation right transfer request to the SBC collaboration aid 7A (as indicated by the arrow (6)). The SBC collaboration aid 7A opens the manipulation right transfer request window illustrated in FIG. 11A. The response to the manipulation right transfer, which is input through the manipulation right transfer request window, is transmitted from the SBC client 6A to the proxy server 10 (as indicated by the arrow (7)). The client input port 15 of the proxy server 10 supplies the response to the collaboration manipulation-right controller 33 (as indicated by the arrow (8)). If the response represents the acceptance of the transfer of the manipulation right, then the collaboration manipulation-right controller 33 updates the current privileged user ID, and transmits the updated privileged user information to all the SBC clients 6A through 6C (as indicated by the arrows (9)). If the response represents the rejection of the transfer, the collaboration manipulation-right controller 33 maintains the current privileged user ID, and transmits a rejection notice to the SBC client 6C that has made the manipulation right transfer request.

The proxy input ports 8A through 8C of the SBC clients 6A through 6C supply the new privileged user information or the rejection notice to the SBC collaboration aids 7A through 7C, respectively, which then display the transfer negotiation result (as indicated by the arrows (10)).

Returning to FIG. 9, once the manipulation right has been transferred, the new privileged user (for example, the user of the SBC client 6C) manipulates the mouse, the keyboard, and other input devices to execute the application 1 through the SBC browser 5C (ST65). The input manipulation information is transmitted to the proxy server 10, and the manipulation information transmitter 25 determines whether the packet containing the input manipulation information has been transmitted from the privileged user (ST66). If the packet is from the privileged user (YES in ST66), the manipulation information transmitter 25 relays this input manipulation information to the SBC server 3 (ST67). The SBC server 3 executes the application 1 in accordance with the input manipulation information (ST68). If the packet is from the non-privileged user (NO in ST66), the manipulation information transmitter 25 discards the packet at the manipulation information discard unit 28.

The SBC server 3 transmits the update screen information, which represents the execution result of the application, to the proxy server 10 (ST69). The proxy server 10 receives and copies the updated screen information as many as the number of the participating users, and distributes a copy to each of the SBC clients 6A through 6C (ST70 and ST71). The SBC clients 6A through 6C display the updated execution screen on the SBC browsers 5A through 5C, respectively (ST72 and ST73).

The system behavior during the copy and delivery of the updated screen information has already been described in conjunction with FIG. 8, and the explanation thereof will be omitted. The execution of the application 1 by the new privileged user continues until the manipulation right request button 54 is next clicked and the request is accepted, and steps ST65 through ST73 are repeated.

Although only the privileged user provided with the manipulation right can actually execute the application 1 on the SBC server 3, the location of the manipulation right can be changed any time through negotiation between the privileged user and the ordinary users in the session group. The location and transfer of the manipulation right are controlled comprehensively by the collaboration manipulation-right controller 33 of the proxy server 10, and the burden on the SBC client 6 is reduced.

Regardless of the location of the manipulation right, the execution screen of the application 1 is copied and delivered to all the SBC clients 6, and displayed in real time. Seeing from the standpoint of the SBC server 3, the client that executes the application 1 is the session group 1 (or the proxy server 10), and the basic specification of the existing SBC middleware 2 on the condition of one-to-one correspondence between the client and the execution of the application is not changed.

In the embodiment described above, the session is started when all the candidates (or the registered users) participate in the session, and the process sequence and the system behavior are also described based on this example. However, the system may be designed so as to allow a user belonging to the session group I to participate in the collaboration halfway through the session. In this case, the privileged user having the manipulation right may start the collaboration by generating a collaboration start instruction at his/her discretion, while checking the login statuses of the other participants. The SBC clients 6B and 6C do not have to wait until all the candidates participate in the session, but only wait until the privileged user starts the collaboration.

Figure 12A:
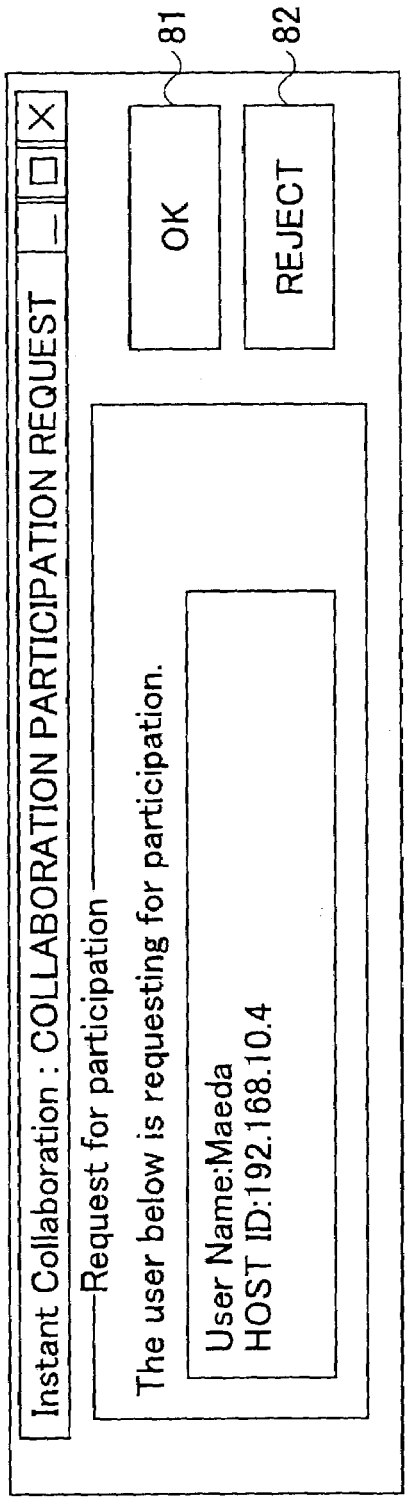
FIG. 12A illustrates an example of the window for a collaboration participation request.

The system can also be designed so that the privileged user permits or rejects the participation of a user belonging to the session group I. In the operations of this example, the SBC client 6D (not shown) activates the SBC collaboration browser 41, and makes a connection request to the proxy server 10 during the collaboration session. In response to the connection request, client authentication is conducted. Then, the collaboration session manager 32 of the proxy server 10 retrieves the session ID based on the input port number, and determines whether the session identified by the retrieved session ID is going on. If the session is in progress, the collaboration manipulation-right controller 33 checks the current privileged user ID, and transmits the collaboration participation request to the privileged user (e.g., SBC client 6A). The SBC client 6A receives the participation request, and the SBC collaboration aid 7A opens a collaboration participation request window illustrated in FIG. 12A.

Figure 12B:
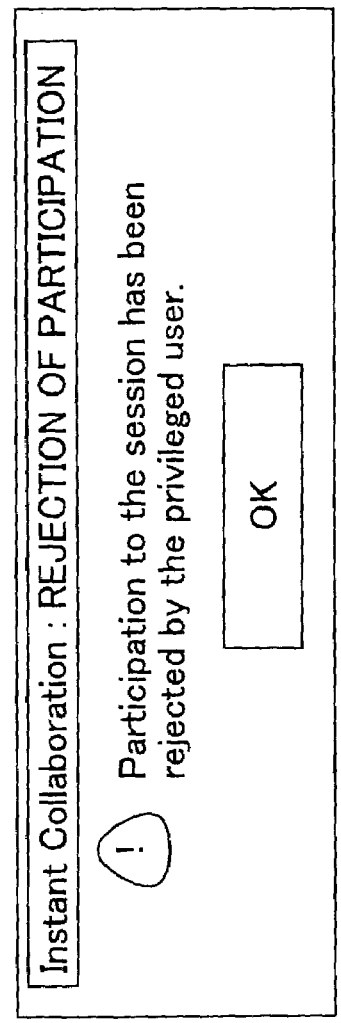
FIG. 12B illustrates an example of the rejection window.

The privileged user permits or rejects the participation request by clicking the "OK" button 81 or the "REJECT" button 82 in the participation request window during the session. If the participation request is rejected, the collaboration session manager 32 of the proxy server 10 transmits a rejection notice to the SBC client 6D that has made the participation request. In this case, the collaboration participation rejection window illustrated in FIG. 12B is opened in the SBC collaboration aid 7D of the SBC client 6D.

If the "OK" button 81 is clicked to permit the participation of the SBC client 6D, the collaboration session manager 32 of the proxy server 10 adds the user ID of the SBC client 6D to the participant user ID list. Simultaneously, the proxy server 10 requests the SBC server 3 to output the full-screen information of the currently executed application screen. The SBC server 3 transmits the full-screen information to the proxy server 10. The SBC browser information distributor 21 of the proxy server 10 transmits the full-screen information to the SBC client 6D that has been permitted to participate in the session halfway. Thus, the current execution screen is displayed on the SBC browser 5D of the SBC client 6D.

The collaboration session manager 32 also transmits the updated participant information to all the SBC clients 6A through 6D. In each of the SBC collaboration aids 7A through 7D, the participant list 52 and the message window 53 (see FIG. 4) are updated. For example, a message "OBSERVATION: Maeda (192.168.10.4)" is added in the participant list 52, and the participation of the SBC client 6D is recorded together with the time in the session record of the message window 53.

To finish the session, the privileged user may forcibly shut down the SBC client 6, or alternatively, the session may be finished through a window different from the collaboration start confirmation window (FIG. 7). In the latter case, making a right click, for example, causes a collaboration stop menu to be displayed on the SBC client 6, and by selecting the stop key, the session is stopped.

Upon receiving a session stop request, the proxy server 10 disconnects the port of this session from the SBC server 3. In the SBC server 3, the application 1 is preserved in the activated state. Therefore, when the proxy server 10 again connects itself to the SBC server 3 through the specific port, the collaboration can be resumed from the status at the time of the disconnection.

In the above-described embodiment, the user ID of the privileged user is used to establish the link between the proxy server 10 and the SBC server 3, but the proxy server 10 may hold a independent client ID and a password in association with the application 1 to establish the link.

The SBC collaboration system β is applicable to the various fields of education, medical treatment, design, architecture, construction, and so on. In the actual scene of collaboration, SBC clients 6 with the minimum functions, such as a display and a simple input device, are prepared. A high-load application is installed and executed in the SBC server 3, and the execution screen information is distributed to all the SBC clients participating in the session in real time. The session record and the location of the manipulation right are managed by the proxy server 10 in a centralized manner, which greatly lightens the burden on the respective SBC clients.

Any type of terminal device with the existing SBC browser, such as desktop PCs, note-type personal computers, PDAs, cellular phones, etc. can be used as the SBC client. By simply adding the SBC collaboration aid 7 to these terminal devices, SBC collaboration is realized using an arbitrary application operating on the remote SBC server 3.

The proxy server 10 and the SBC collaboration aid 7 of the SBC client 6 are realized by any one of, or any combination of hardware, software, and firmware. If the SBC collaboration aid 7 is built by software, an SBC collaboration aid program may be stored in a computer-readable recording medium, which is then distributed to the SBC client. Alternatively, the SBC collaboration aid program may be distributed from the proxy server 10 via the network to the SBC client.

When realized by software, the SBC collaboration aid 7 installed in the SBC client 6 comprises the following instructions:

(a) causing each of the SBC clients to indicate the location of a manipulation right when the proxy server gives the manipulation right to a first SBC client;

(b) causing each of the SBC clients to display an execution screen of the application that is transmitted from the proxy server when the first SBC client has executed the application; and (c) causing each of the SBC clients to display transfer of the manipulation right when a second SBC client has acquired the manipulation right from the first SBC client.

The SBC collaboration aid 7 may further comprise the instruction of allowing each of the SBC clients to produce a manipulation right transfer request as necessary.

By simply installing the SBC collaboration aid in the existing SBC client terminal, server-based computing collaboration becomes available using an application operating on the remote SBC server.

To realize the proxy server by software, an SBC collaboration program is installed in the proxy server. The SBC collaboration program comprises the following instructions:

(a) causing the proxy server to give a manipulation right to a first SBC client among the SBC clients;

(b) causing the proxy server, when receiving first input manipulation information from the first SBC client, to relay the first input manipulation information to the SBC server to cause the application to be executed; and (c) causing the proxy server, when receiving an execution screen of the application from the SBC server, to distribute the execution screen to each of the SBC clients.

By installing these functions in the proxy server, server-based computing collaboration is realized using the exiting SBC system.

As has been described above, according to the present invention, multiple SBC clients can share an application operating on the SBC server and collaborate with each other on the application, while utilizing the existing SBC middleware planed for one-to-one correspondence between an SBC client and the execution of the application.

During the collaboration, the updated screen information resulting from the execution of the application is copied and distributed to each of the SBC clients. This arrangement guarantees the response ability of the SBC collaboration system.

Although the present invention has been described based on the preferred embodiments, the invention is not limited to these examples, but includes various modifications and substitutions that can be made by a person skilled in the art, without departing from the scope of the present invention.

This patent application is based on and claims the benefit of the earlier filing date of Japanese patent application No. 2002-108396 filed Apr. 10, 2002, the entire contents of which are hereby incorporated by reference.

What is claimed is:

1. A server-based computing collaboration system comprising:
an SBC server furnished with SBC middleware capable of installation of an application;
a plurality of SBC clients connected to the SBC server via a network to remotely use the application; and
a proxy server inserted between the SBC server and the SBC clients in an arbitrary region on the network,
wherein the proxy server gives a manipulation right to execute the application to a first SBC client among the SBC clients, then upon receiving first input manipulation information from the first SBC client, transmits the first input manipulation information to the SBC server to cause the application to be executed, and distributes an execution screen to each of the SBC clients when receiving the execution screen from the SBC server.

2. The server-based computing collaboration system according to claim 1, wherein the proxy server manages and controls transfer of the manipulation right among the SBC clients.

3. The server-based computing collaboration system according to claim 1, wherein the proxy server makes copies of the execution screen, and distributes the copies of the execution screen to the SBC clients.

4. The server-based computing collaboration system according to claim 1, wherein when the proxy server receives second input manipulation information from a second SBC client that does not have the manipulation right, then the proxy server discards the second input manipulation information.

5. The server-based computing collaboration system according to claim 1, wherein when the proxy server receives a manipulation right transfer request from a second SBC client that does not have the manipulation right, then the proxy server transmits the manipulation right transfer request to the first SBC client to inquire about the transfer of the manipulation right.

6. The server-based computing collaboration system according to claim 5, wherein when the proxy server receives an acceptance of the transfer of the manipulation right from the first SBC client, the proxy server transfers the manipulation right to the second SBC client.

7. The server-based computing collaboration system according to claim 1, wherein the manipulation right is a right to exclusively execute the application.

8. A proxy server inserted between an SBC server and a plurality of SBC clients connected to the SBC server via a network in a server-based computing system, the SBC server being furnished with SBC middleware capable of installation of an application, the proxy server comprising:
a manipulation right controller that gives a manipulation right to execute the application to a first SBC client among the SBC clients;
a manipulation information relay unit that receives first input manipulation information of executing the application from the first SBC client and transmits the first input manipulation information to the SBC server to cause the application to be executed, and
an execution screen distributor that receives an execution screen of the application from the SBC server and distributes the execution screen to each of the SBC clients.

9. The proxy server according to claim 8, wherein the execution screen distributor includes a copy unit that makes copies of the execution screen for the distribution of the execution screen to each of the SBC clients.

10. The proxy server according to claim 8, wherein the manipulation information relay unit includes:
a determination unit that, when receiving input manipulation information from any of the SBC clients, determines whether or not the received input manipulation information is the first input manipulation information transmitted from the first SBC client; and a discard unit that, if the determination result of the determination unit is negative, discards the received input manipulation information.

11. The proxy server according to claim 10, wherein if the determination result represents that the received input manipulation information is the first input manipulation information, then the manipulation information relay unit transmits the received input manipulation information to the SBC server.

12. The proxy server according to claim 8, wherein when receiving a manipulation right transfer request from a second SBC client that does not have the manipulation right, the manipulation right controller transmits the manipulation right transfer request to the first SBC client to inquire about the transfer of the manipulation right.

13. The proxy server according to claim 12, wherein when receiving an acceptance of the transfer of the manipulation right from the first SBC client, the manipulation right controller transfers the manipulation right to the second SBC client.

14. The proxy server according to claim 8, wherein the manipulation right is a right to exclusively execute the application.

15. A server-based computing collaboration method comprising the steps of:

inserting a proxy server between an SBC server furnished with SBC middleware capable of installation of an application and a plurality of SBC clients connected to the SBC server via a network to remotely use the application;

giving a manipulation right to execute the application to a fist SBC client among the plurality of the SBC clients from the proxy server;

receiving, at the proxy server, first input manipulation information produced by the first SBC client and transmitting the first input manipulation information from the proxy server to the SBC server to cause the application to be executed; and making copies of an execution screen of the application at the proxy server to distribute the execution screen to each of the SBC clients.

16. The server-based computing collaboration method according to claim 15, further comprising the steps of:

giving a browsing right to browse the execution screen to all of the SBC clients; and when second input manipulation information is produced by a second SBC client that does not have the manipulation right, discarding at the proxy server the second input manipulation information.

17. The server-based computing collaboration method according to claim 15, further comprising the steps of:

allowing a second SBC client to produce a manipulation right transfer request;

receiving at the proxy server the manipulation right transfer request and transmitting the manipulation right transfer request from the proxy server to the first SBC client to inquire about the transfer of the manipulation right; and when receiving an acceptance of the transfer of the manipulation right from the first SBC client, transferring at the proxy server the manipulation right from the first SBC client to the second SBC client.

18. The server-based computing collaboration method according to claim 15, wherein the manipulation right is a right to exclusively execute the application.

19. Server-based computing collaboration logic incorporated in and executed by a proxy server inserted between an SBC server that is furnished with SBC middleware capable of installation of an application and a plurality of SBC clients connected to the SBC server via a network to remotely use the application in an server-based computing system, the collaboration logic comprising instructions of:

causing the proxy server to give a manipulation right to a first SBC client among the SBC clients;

causing the proxy server, when receiving first input manipulation information from the first SBC client, to relay the first input manipulation information to the SBC server to cause the application to be executed; and causing the proxy server, when receiving an execution screen of the application from the SBC server, to distribute the execution screen to each of the SBC clients.

20. The Server-based computing collaboration logic according to claim 19, wherein the manipulation right is a right to exclusively execute the application.

21. A server-based computing collaboration aid incorporated in and executed by each of a plurality of SBC clients connected via a network and a proxy server to an SBC server that is furnished with SBC middleware capable of installation of an application, the server-based computing collaboration aid comprising the instructions of:

causing each of the SBC clients to indicate a location of a manipulation right when the proxy server gives the manipulation right to a first SBC client among the SBC clients;

causing each of the SBC clients to display an execution screen of the application that is transmitted from the proxy server when the first SBC client has executed the application; and causing each of the SBC clients to display transfer of the manipulation right when a second SBC client has acquired the manipulation right from the first SBC client.

22. The server-based computing collaboration aid according to claim 21, further comprising the instruction of:

allowing each of the SBC clients to produce a manipulation right transfer request as necessary.

23. The server-based computing collaboration aid according to claim 21, wherein the manipulation right is a right to exclusively execute the application.

* * * * *